(12) United States Patent
Dole et al.

(10) Patent No.: US 7,478,843 B2
(45) Date of Patent: Jan. 20, 2009

(54) COUPLING ASSEMBLY HAVING CONICAL INTERFACING SURFACES

(75) Inventors: Douglas R. Dole, Whitehouse Station, NJ (US); Frank J. Cygler, III, Nazareth, PA (US)

(73) Assignee: Victaulic Company, Easton, PA (US)

( * ) Notice: Subject to any disclaimer, the term of this patent is extended or adjusted under 35 U.S.C. 154(b) by 5 days.

(21) Appl. No.: 11/775,949

(22) Filed: Jul. 11, 2007

(65) Prior Publication Data

US 2008/0012324 A1 Jan. 17, 2008

Related U.S. Application Data

(60) Provisional application No. 60/830,734, filed on Jul. 13, 2006.

(51) Int. Cl.
*F16L 55/00* (2006.01)
*F16L 23/028* (2006.01)

(52) U.S. Cl. .................. 285/368; 285/332.1; 285/332.3; 285/412; 285/148.28

(58) Field of Classification Search ............ 285/148.25, 285/148.28, 332.1, 332.2, 332.3, 334.1, 334.2, 285/334.3, 368, 412, 413, 414, 415
See application file for complete search history.

(56) References Cited

U.S. PATENT DOCUMENTS

| | | | | |
|---|---|---|---|---|
| 151,186 | A * | 5/1874 | Worswick | 285/414 |
| 253,482 | A * | 2/1882 | Mixer | 285/331 |
| 790,767 | A * | 5/1905 | Walsh | 285/332.1 |
| 808,923 | A * | 1/1906 | Herrick | 285/342 |
| 925,770 | A * | 6/1909 | Herrick | 285/334.3 |
| 1,014,053 | A * | 1/1912 | Dolensky | 285/332.3 |
| 1,137,955 | A | 5/1915 | Dies | 285/386 |
| 1,784,667 | A | 12/1930 | Gillet | 411/532 |
| 1,851,143 | A * | 3/1932 | Wilson | 285/342 |
| 2,187,217 | A | 1/1940 | Winslow | 285/344 |
| 2,196,622 | A | 4/1940 | Bean | 285/332.3 |
| 2,380,690 | A | 7/1945 | Graham | 285/114 |
| 2,434,107 | A | 1/1948 | Folsom | 285/5 |
| 2,617,672 | A | 11/1952 | Nichols | 403/183 |
| 3,476,413 | A | 11/1969 | Coberly et al. | 285/332.3 |
| 3,482,859 | A | 12/1969 | Bowlin | 285/332.3 |
| 3,779,564 | A | 12/1973 | Chookazian | 277/626 |

(Continued)

FOREIGN PATENT DOCUMENTS

GB 2211255 6/1989

*Primary Examiner*—James M Hewitt
(74) *Attorney, Agent, or Firm*—Ballard Spahr; Andrews & Ingersoll LLP

(57) ABSTRACT

A pipe coupling assembly including a fitting having an opening surrounded by an inwardly facing conical surface. A pipe element has an end portion with an outwardly facing conical surface that fits within the opening and engages the inwardly facing conical surface. A shoulder is positioned on the pipe element. A retaining ring surrounds the pipe element and engages the shoulder. A fastener connects the retaining ring to the fitting. The fastener is adjustably tightenable to draw the retaining ring toward the fitting and force the pipe end portion into engagement with the fitting. One or more seals may be positioned between the engaged conical surfaces. The seal may be made of graphite for high temperature applications. An adapter ring that fits between the pipe and the fitting is also disclosed. The adapter ring has conical surfaces that engage the conical surfaces of the pipe and the fitting.

15 Claims, 10 Drawing Sheets

U.S. PATENT DOCUMENTS

| | | | |
|---|---|---|---|
| 4,119,335 A * | 10/1978 | Rieffle et al. | 285/337 |
| 4,648,632 A * | 3/1987 | Hagner | 285/334.1 |
| 4,786,090 A | 11/1988 | Mott | 285/332.3 |
| 4,802,695 A | 2/1989 | Weinhold | 285/91 |
| 4,832,379 A * | 5/1989 | Smith et al. | 285/323 |
| 4,861,077 A * | 8/1989 | Welkey | 285/334.1 |
| 4,874,191 A | 10/1989 | Green | 285/332.3 |
| 4,875,713 A | 10/1989 | Carstensen | 285/55 |
| 4,896,903 A | 1/1990 | Shumard | 285/337 |
| 5,129,685 A | 7/1992 | Engel | 285/231 |
| 5,169,182 A * | 12/1992 | Hashimoto | 285/332.2 |
| 5,393,108 A | 2/1995 | Kerr | 285/368 |
| 5,716,078 A | 2/1998 | Powers | 285/110 |
| 5,845,945 A | 12/1998 | Carstensen | 285/321 |
| 5,899,507 A * | 5/1999 | Schroeder et al. | 285/343 |
| 5,961,153 A * | 10/1999 | Foster | 285/15 |
| 5,988,696 A * | 11/1999 | Ruppert | 285/123.1 |
| 6,264,251 B1 | 7/2001 | Kunsman et al. | 285/405 |
| 6,276,729 B1 | 8/2001 | Sanwald et al. | 285/415 |
| 6,435,563 B2 | 8/2002 | Phillips | 285/56 |
| 7,000,953 B2 | 2/2006 | Berghaus | 285/354 |
| 7,093,864 B2 | 8/2006 | Wasmuth | 285/389 |

* cited by examiner

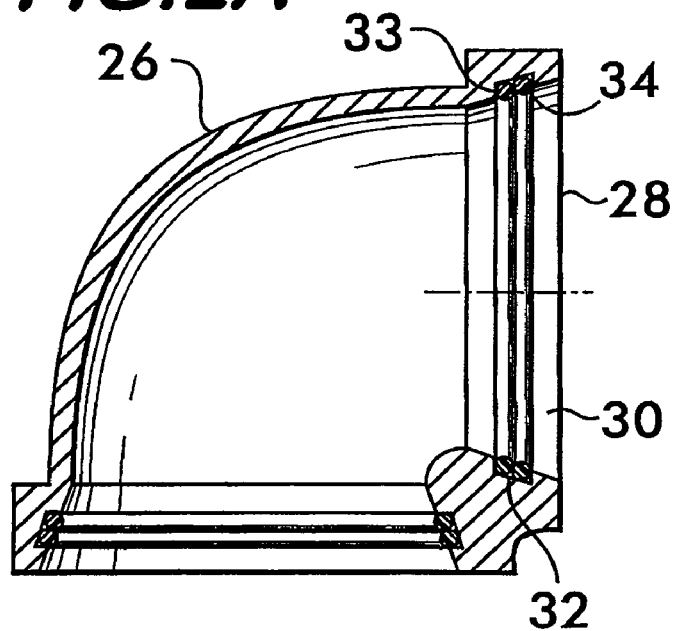
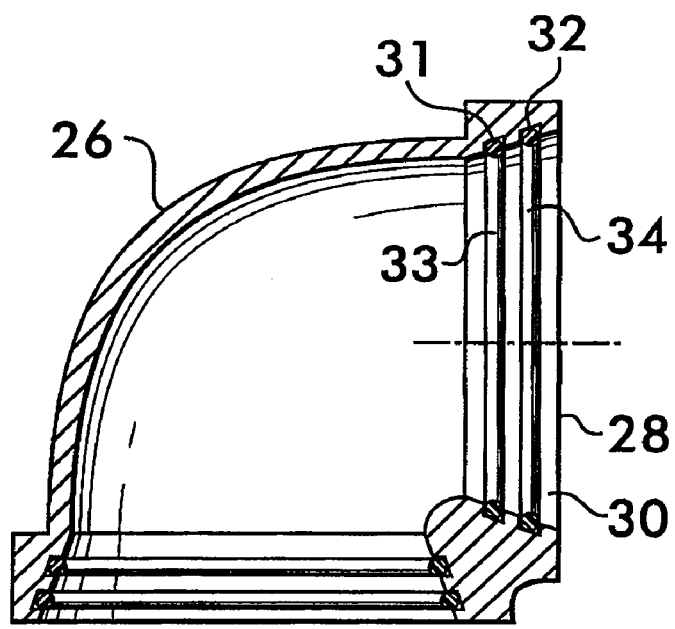

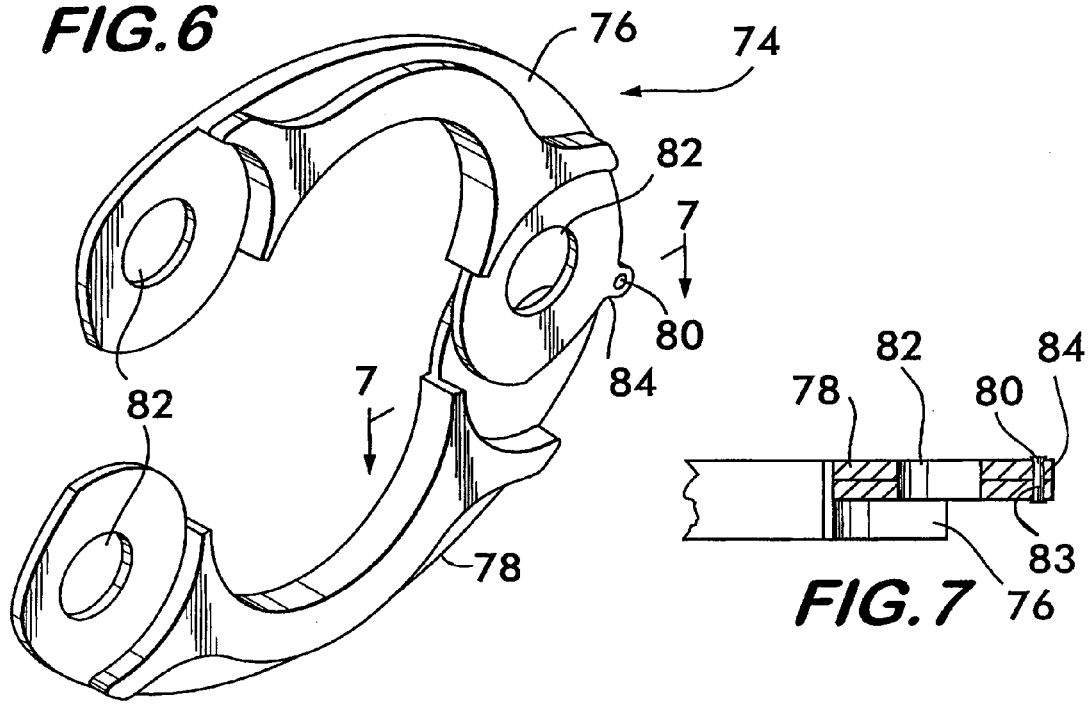
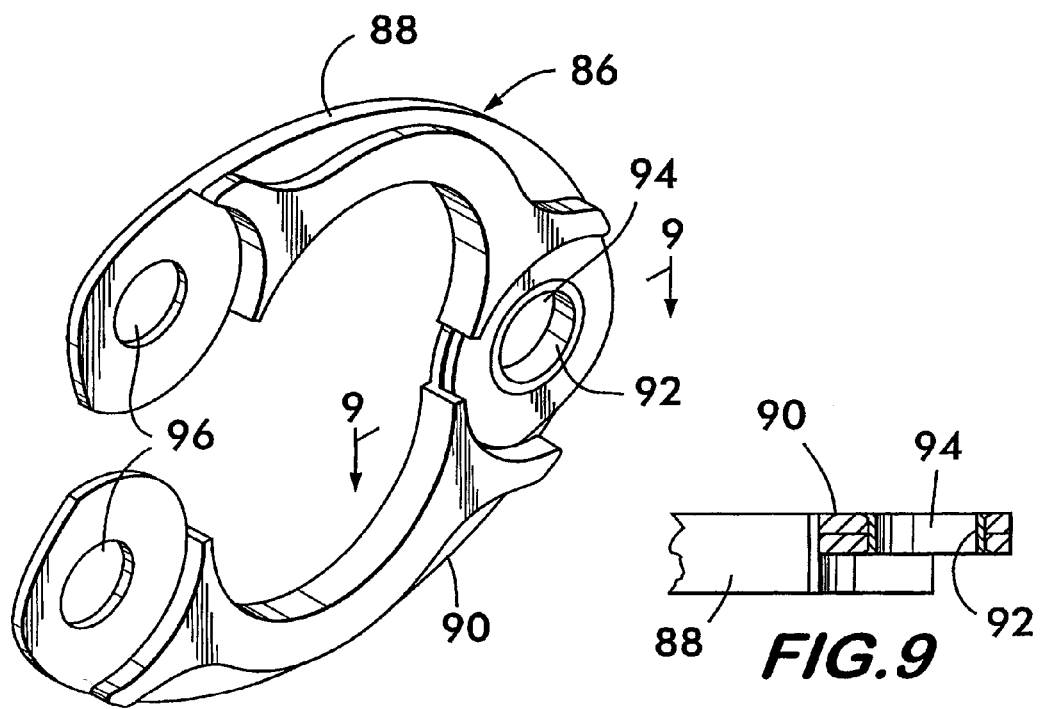

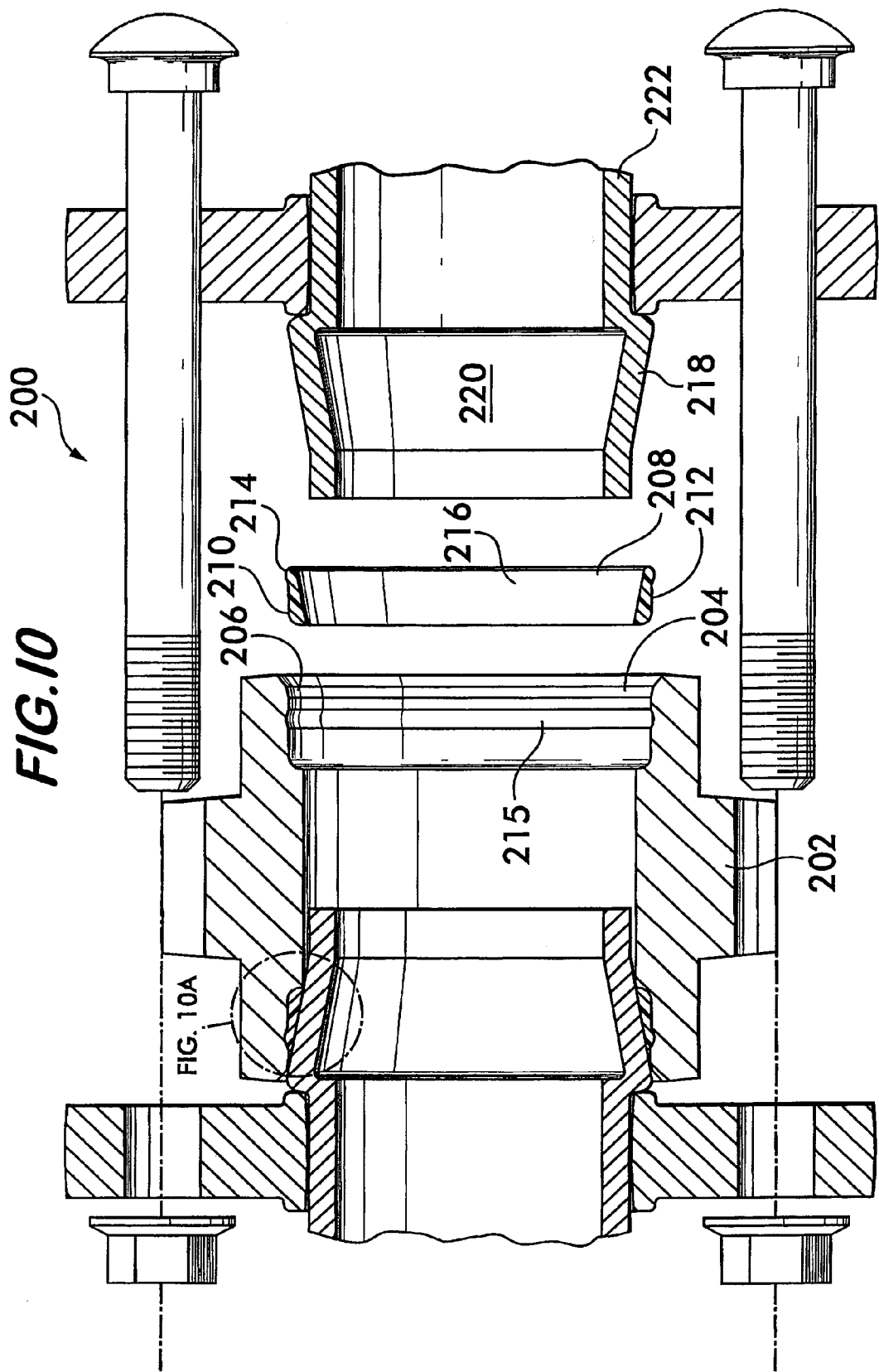

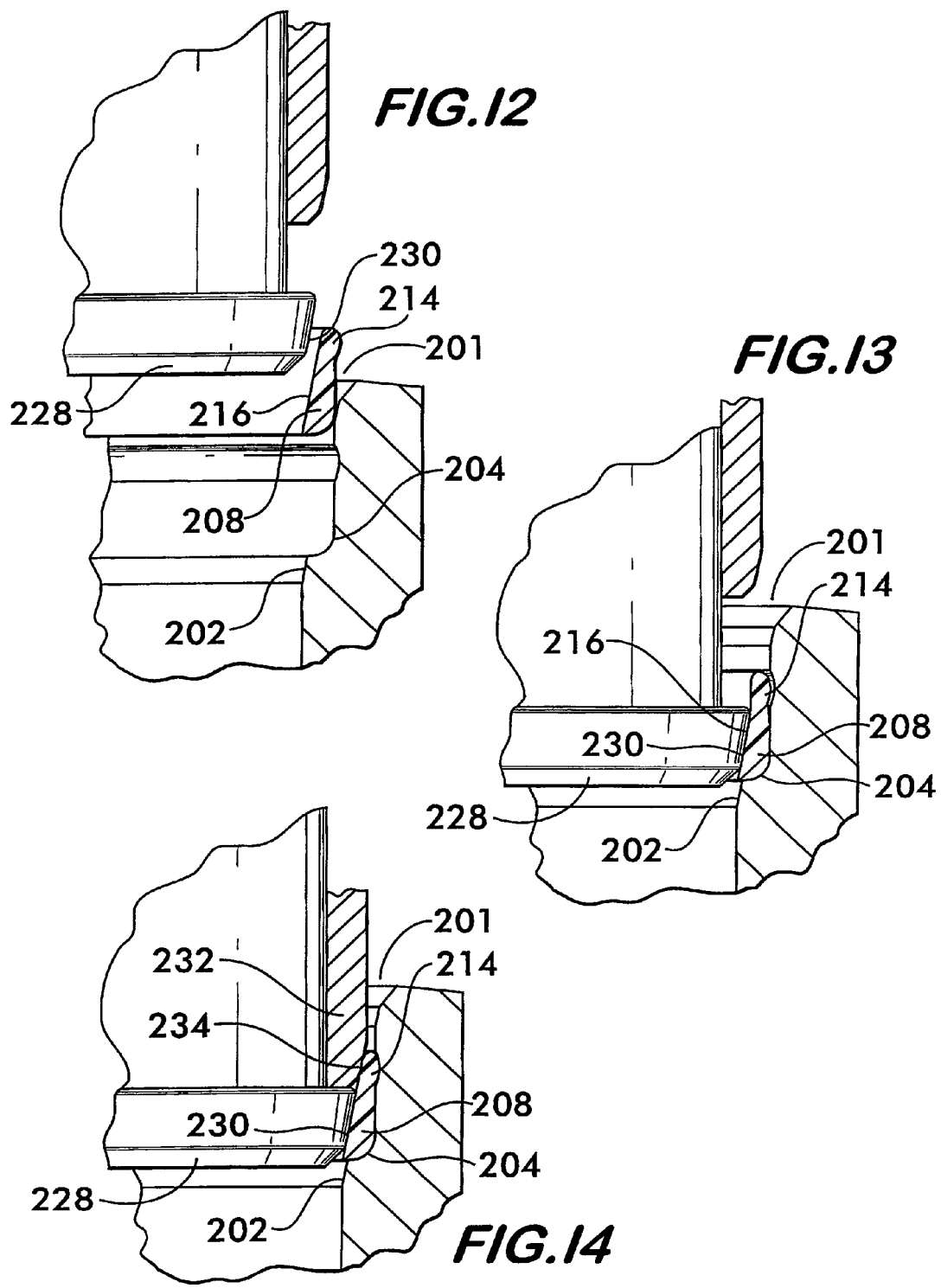

COUPLING ASSEMBLY HAVING CONICAL INTERFACING SURFACES

CROSS REFERENCE TO RELATED APPLICATION

This application is based on and claims priority to U.S. Provisional Application No. 60/830,734, filed Jul. 13, 2006.

FIELD OF THE INVENTION

This invention relates to coupling assemblies for joining pipe elements in end-to-end relation.

BACKGROUND OF THE INVENTION

Mechanical couplings for joining pipe elements together end-to-end are often preferred over more permanent methods for joining pipe, such as welding or brazing. Mechanical couplings allow for the rapid assembly and modification of piping networks by mechanical technicians without specialized welding skills or the need for fire watches or hot work permits. The term "pipe element" is used herein to describe any pipe-like item or component having a pipe-like form. Pipe elements include pipe stock, pipe fittings such as elbows, caps and tees as well as fluid control components such as valves, reducers, strainers, restrictors, pressure regulators and the like.

Prior art mechanical couplings for joining pipe elements together end-to-end may comprise interconnectable segments that are positionable circumferentially surrounding the end portions of co-axially aligned pipe elements. Each mechanical coupling segment comprises a bridge structure having arcuate surfaces which project radially inwardly and engage plain end pipe elements or circumferential grooves that extend around each of the pipe elements to be joined. Engagement between the arcuate surfaces and the pipe elements provides mechanical restraint to the joint and ensures that the pipe elements remain coupled even under high internal pressure and external forces. The bridge structure defines an annular channel that receives a gasket or seal, typically an elastomeric ring which engages the ends of each pipe element and cooperates with the segments to provide a fluid tight seal.

While prior art couplings are effective, they exhibit certain drawbacks. For example, when such couplings are used with fittings such as elbows and tees, a separate coupling is needed at each connection point, rendering such points heavy and bulky. The couplings also cause a significant increase in the center to end dimension of the fitting. Furthermore, the seals used with these couplings tend to be large, and if made from expensive materials such as fluorinated elastomers, the coupling assembly may be prohibitively expensive.

Prior art mechanical fittings that are specifically designed to avoid these disadvantages, such as threaded fittings, bring other problems. For example, it is well known that threaded coupling systems suffer a relatively high initial leak rate, wherein as many as 8% of the joints may leak when first tested under pressure. Threaded systems also tend to be relatively expensive due to the need to cut threads in the pipes and fittings to be joined. Additionally, for larger diameter pipes, threaded systems require high torque to effect a good connection. Threaded systems also require special fittings known as unions to be used throughout a network in order to allow specific portions of the network to be disassembled without disassembling the entire system. This is due to the threaded nature of such systems where turning a pipe to disengage it from one fitting tightens the fitting at the opposite end and prevents removal of the pipe. Pipes in a threaded system need to be of sufficient thickness to cut threads into the pipe sidewall. Thus, thin-walled pipe elements cannot be used when the design requires, resulting in an overweight, heavy piping network with pipes having sidewalls far thicker than necessary to bear the internal pressure or external loads expected. Furthermore, there are always exposed threads adjacent to every fitting engaged by a pipe. These exposed threads comprise a weak point for bending strength and allow for increased failure due to corrosion because they constitute the thinnest region of the pipe sidewall and provide a source of stress concentration. There are clear advantages to be realized by using mechanical pipe couplings which do not suffer such drawbacks.

SUMMARY OF THE INVENTION

The invention concerns a pipe coupling assembly for joining pipe elements in end to end relation. One coupling assembly embodiment comprises a fitting having an opening surrounded by an inwardly facing conical surface. A first lug is positioned on the fitting and projects outwardly therefrom. The first lug has an aperture therein. A pipe element has an end portion with an outwardly facing conical surface. The surface is sized to interfit within the opening and engage the inwardly facing conical surface of the fitting. A shoulder is positioned on the pipe element adjacent to the end portion. The shoulder projects radially outwardly from the pipe element. A retaining ring surrounds the pipe element and engages the shoulder. A second lug is positioned on the retaining ring and projects outwardly from it. The second lug has an aperture therein. A fastener extends between the apertures of the first and second lugs for connecting the retaining ring to the fitting. The fastener is adjustably tightenable for drawing the retaining ring toward the fitting and thereby forcing the end portion into engagement with the fitting.

A seal is positioned between the inwardly and outwardly facing conical surfaces. For high temperature applications, the seal may be formed of graphite. Preferably, the seal is received within a circumferential groove located in the inwardly facing conical surface.

The outwardly facing conical surface may have a cone angle between about 5 degrees and about 15 degrees relative to a longitudinal axis of the pipe, and preferably a cone angle of about 10 degrees. The inwardly facing conical surface may also have a cone angle between about 5 degrees and about 15 degrees relative to a longitudinal axis of the fitting, and preferably a cone angle of about 10 degrees.

In another embodiment, the pipe coupling assembly comprises a fitting having first and second openings oppositely disposed. The first opening is surrounded by a first inwardly facing conical surface. The second opening is surrounded by a second inwardly facing conical surface. First and second pipe elements interfit within the first and second openings. The first pipe element has a first end portion with a first outwardly facing conical surface sized to interfit within the first opening and engage the first inwardly facing conical surface. The second pipe element has a second end portion with a second outwardly facing conical surface sized to interfit within the second opening and engage the second inwardly facing conical surface. A first shoulder is positioned on the first pipe element adjacent to the first end portion. The first shoulder projects radially outwardly from the first pipe element. A second shoulder is positioned on the second pipe element adjacent to the second end portion and projects radially outwardly from the second pipe element. A first retaining ring surrounds the first pipe element and engages the first shoulder. A second retaining ring surrounds the second pipe element and engages the second shoulder. A fastener connects the first retaining ring to the second retaining ring. The fastener is adjustably tightenable for drawing the retaining rings toward one another and forcing the first and second end portions into engagement with the fitting.

A seal is positioned between at least one of the inwardly and outwardly facing conical surfaces. For high temperature applications, the seal may be formed of graphite. Preferably, the seal is received within a circumferential groove located in the inwardly facing conical surface.

At least one of the outwardly facing conical surfaces has a cone angle between about 5 degrees and about 15 degrees relative to a longitudinal axis of the pipe, and preferably a cone angle of about 10 degrees. One of the inwardly facing conical surfaces has a cone angle between about 5 degrees and about 15 degrees relative to a longitudinal axis of the fitting, and preferably a cone angle of about 10 degrees.

In yet another embodiment, the pipe coupling assembly comprises a fitting having an opening surrounded by an inwardly facing conical surface. A pipe element has an end portion with an outwardly facing conical surface. A shoulder is positioned on the pipe element adjacent to the end portion. The shoulder projects radially outwardly. A retaining ring surrounds the pipe element and engages the shoulder. An adapter ring is positioned between the pipe element and the fitting. The adapter ring has an outwardly facing conical surface sized to engage the inwardly facing conical surface of the fitting, and an inwardly facing conical surface sized to engage the outwardly facing conical surface of the pipe element end portion. A fastener connects the retaining ring to the fitting. The fastener is adjustably tightenable for forcing the end portion into engagement with the adapter ring and the adapter ring into engagement with the fitting.

A first seal may be positioned between the fitting and the adapter ring. A second seal may be positioned between the adapter ring and the pipe element end portion. The first seal may be positioned within a first circumferential groove positioned in the inwardly facing conical surface of the fitting. The second seal may be positioned within a second circumferential groove positioned in the inwardly facing conical surface of the adapter ring. For high temperature applications the seals are formed of graphite.

A method of inserting a graphite seal, or other seal made from a pliant material, into a fitting is also disclosed. The method comprises:

(a) positioning the seal at a mouth of the fitting;

(b) inserting a seating tool into the fitting, the seal being between the seating tool and the fitting;

(c) contacting the seal with the seating tool and dragging the seal into the fitting to position it adjacent to an interior contoured surface of the fitting where the seal is to be seated;

(d) inserting a deforming tool into the fitting, the seal being between the deforming tool and the interior contour surface; and (e) contacting the seal with the deforming tool to conform the seal with the interior contour surface.

BRIEF DESCRIPTION OF THE DRAWINGS

FIGS. 2A and 2B are longitudinal sectional views of embodiments of fittings used in the assembly according to the invention;

FIG. 6 is a perspective view of a component of a coupling assembly according to the invention;

FIG. 7 is a cross-sectional view taken at line 7-7 of FIG. 6;

FIG. 8 is an isometric view of a component of a coupling assembly according to the invention;

FIG. 9 is a cross-sectional view taken at line 9-9 of FIG. 8;

FIG. 10 is a longitudinal cross sectional view of an embodiment of a coupling assembly according to the invention;

FIGS. 12-14 illustrate a method of installing a seal in a coupling according to the invention.

DETAILED DESCRIPTION OF THE EMBODIMENTS

Figure 1:
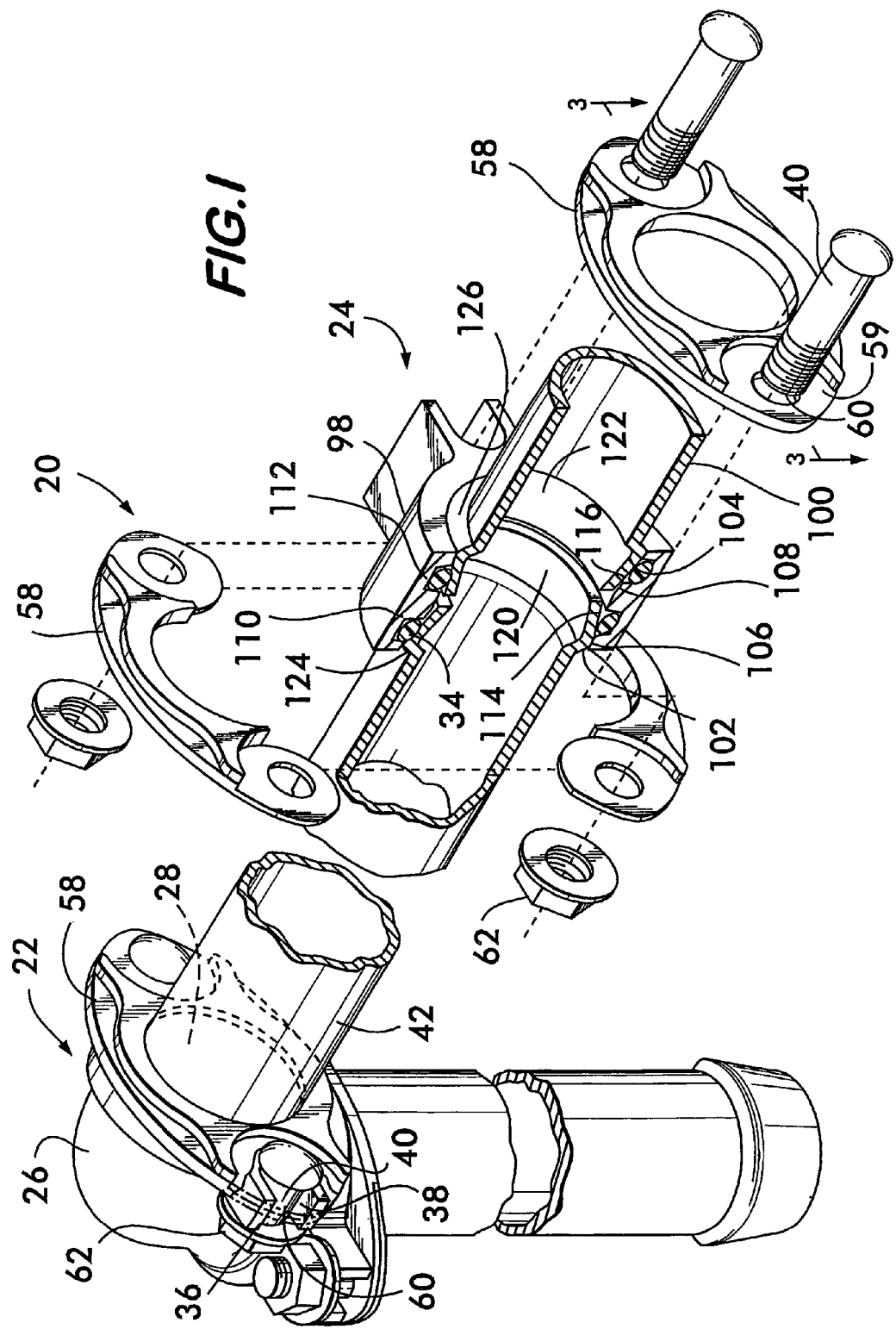
FIG. 1 is a longitudinal sectional perspective view of a portion of a piping network having pipe coupling assemblies according to the invention.
Figure 2:
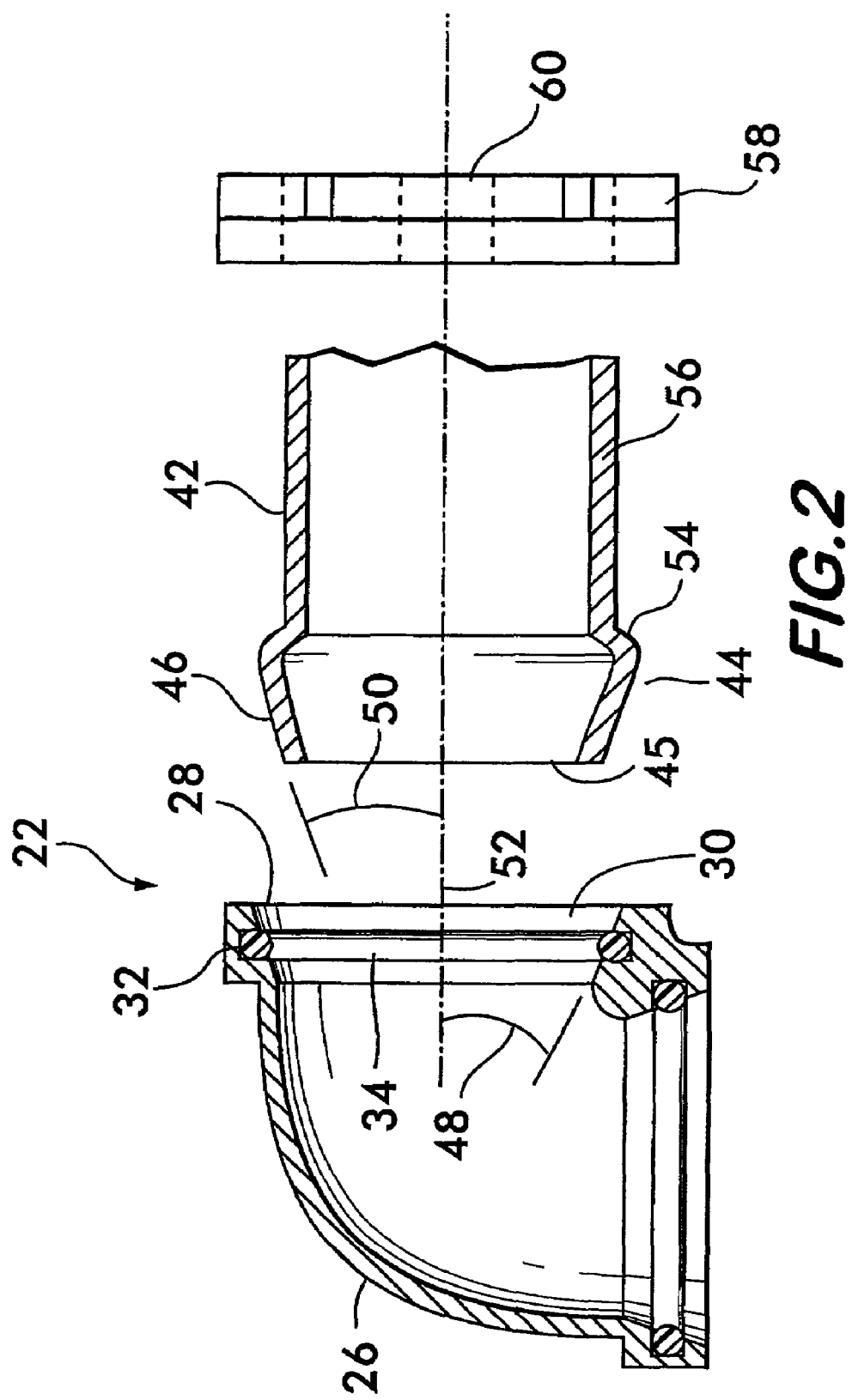
FIG. 2 is an exploded longitudinal sectional side view showing components of a coupling assembly according to the invention.

FIG. 1 shows a portion of a piping network 20 using pipe coupling assemblies 22 and 24 according to the invention. Assembly 22, also shown in FIG. 2, comprises an elbow fitting 26 having an opening 28 surrounded by an inwardly facing conical surface 30. A circumferential groove 32 is positioned within the surface 30, the groove receiving a seal 34, for example, an O-ring. Other seal configurations are also feasible. As shown in FIG. 2A, two seals 33 and 34 may be positioned within a single groove 32. Furthermore, as shown in FIG. 2B, two seals 33 and 34 may be positioned each within their own respective groove 31 and 32. It may be advantageous to use multiple seals having different properties. For example, for pipe networks carrying hot water, it is advantageous to form the inner seal 33, which will be exposed to high temperature water, from a material, such as EPDM, which has excellent high temperature characteristics. The outer seal 34, which will be exposed to air containing oxygen at elevated temperature, is best formed from a material such as silicone, which has excellent anti-oxidizing resistance.

As best shown in FIG. 1, the elbow fitting 26 has a projection in the form of a lug 36 with an aperture 38 that receives a fastener 40 for coupling a pipe end to the elbow fitting as described below. The lug projects outwardly from the fitting to provide room for the fastener. Preferably, for a balanced design and to afford a fluid tight seal, at least two lugs are positioned on diametrically opposite sides of the fitting. The lugs could have threaded apertures that receive the fasteners or non-threaded apertures as illustrated.

FIGS. 1 and 2 also illustrate a pipe element 42 that mates with the fitting 26. As best shown in FIG. 2, pipe element 42 has an end portion 44 with an outwardly facing conical surface 46 sized to interfit within opening 28 of the fitting 26. In an alternate embodiment, the conical surface 46 may have a circumferential groove which receives a seal. The cone angles 48 and 50 of the inwardly and outwardly facing conical surfaces, respectively, are preferably approximately equal to one another and may range between about 5 degrees and about 15 degrees, with 10 degrees providing an advantageous cone angle for most practical configurations. The cone angles 48 and 50 are measured with respect to the longitudinal axis 52 of the pipe element 42 and provide wedging action upon engagement of the pipe element with the fitting as described below. A shoulder 54 is positioned on the pipe element 42 adjacent to the end portion 44. Shoulder 54 projects radially outwardly from the pipe and preferably extends circumferentially around it. The shoulder may be formed by deforming the sidewall 56 of pipe 42.

A retainer is mounted on the pipe element for engaging the shoulder and retaining the pipe element to the fitting. In the embodiment shown in FIG. 1 the retainer comprises a retaining ring 58 which surrounds the pipe element 42 and engages the shoulder 54. As further shown in FIG. 1, ring 58 has projections in the form of lugs 59 with apertures 60 that receive fasteners 40, the fasteners engaging both the ring and the projections (lugs 38) on fitting 26 to draw the ring toward the fitting and force the ring against the shoulder 54 and thereby force the inwardly and outwardly facing conical surfaces into engagement. For smaller diameter pipe elements, there are preferably two fasteners positioned diametrically opposite to one another. For larger diameter pipe elements, there are preferably two or more fasteners equally spaced circumferentially around the fitting. Other configurations are, of course, feasible.

The fasteners are adjustably tightenable, for example, by way of nuts 62, and tightening of the fasteners draws the retaining ring 58 toward the fitting, thereby forcing the end portion 44 of pipe element 42 into the opening 28 of the elbow fitting 26 (see FIG. 2). This causes the conical surfaces 46 and 30 to engage one another, and due to their complementary cone angles, there results a wedging action that compresses the seal 34 and prevents its extrusion, forms metal to metal contact between the surfaces, increases the rigidity of the joint about both bending and the torsional axes and results in a stable, stiff, fluid tight joint.

Figure 3:
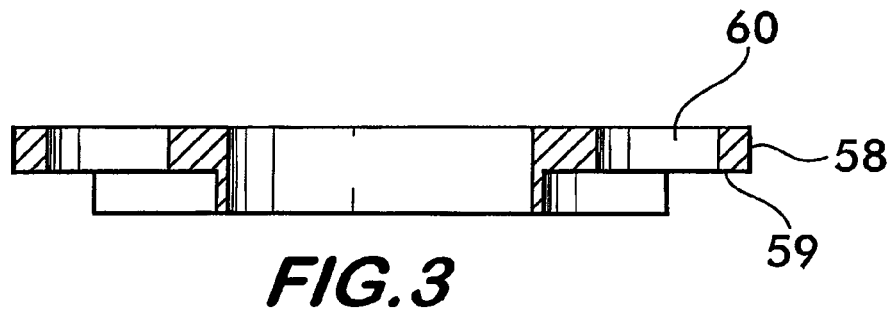
FIG. 3 is a cross section taken at line 3-3 of FIG. 1.

For simplicity of design and a lower part count, it is preferred that retaining ring 58 be a one-piece or unitary design as shown in FIG. 3. However, a one-piece ring requires that the ring be positioned on the pipe element 42 prior to deforming the end portion 44 and creating the shoulder 54 if an opposite, free, undeformed end is not accessible. If this is overlooked or impractical, other ring designs are feasible, as shown in FIGS. 4-9 and described below.

Figure 4:
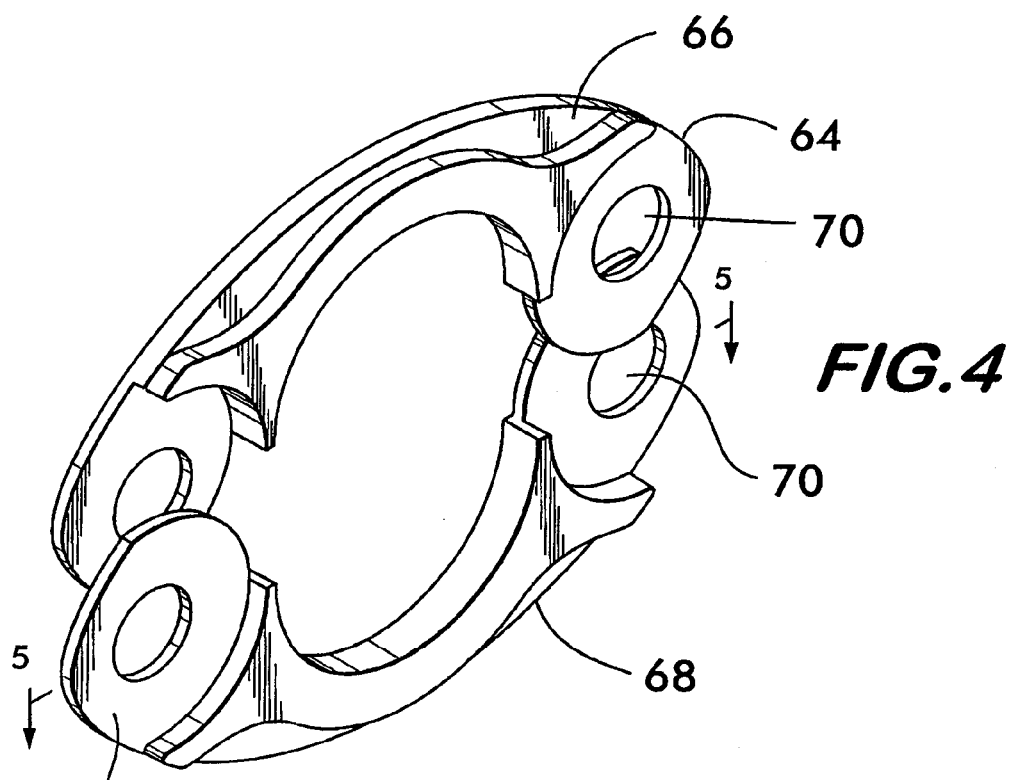
FIG. 4 is an exploded isometric view of a component of a coupling assembly according to the invention.
Figure 5:
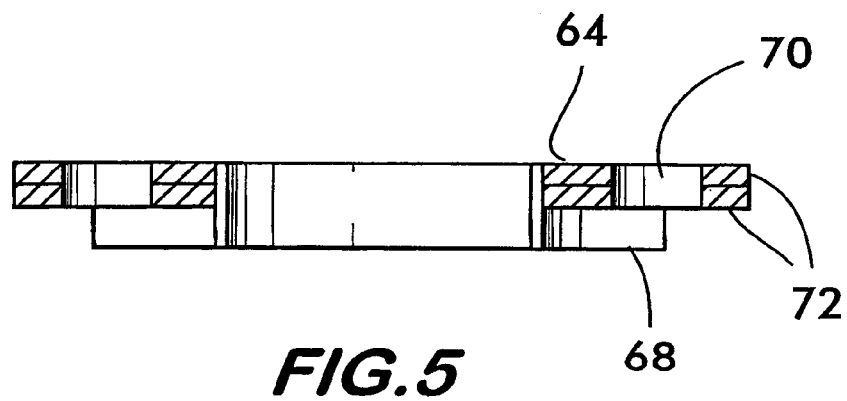
FIG. 5 is a cross-sectional view taken at line 5-5 of FIG. 4.

FIGS. 4 and 5 illustrate a two part ring 64 that comprises ring segments 66 and 68 that engage one another in end to end relation. The ring segments are joined to one another by the fasteners 40 (see FIG. 1) that are received in apertures 70 positioned in the ring segments so that they align with one another when the rings are arranged end to end surrounding the pipe element 42. Preferably, the lugs 72 of the ring segments that surround and define the apertures are half as thick as the remaining portion of the ring segment so that when the ring segments are engaged with one another they both reside in a common plane as best shown in FIG. 5. These features provide one way to make both ring parts identical, thereby simplifying manufacturing and installation.

FIGS. 6 and 7 show a retaining ring 74 comprising ring segments 76 and 78 joined to one another by a hinge 80. The hinge keeps the segments together but allows them to be opened so that the ring 74 can be positioned around a pipe element for which there is no access to a free end. Once positioned around the pipe, the ring segments are pivoted about the hinge 80 to close the ring and bring the apertures 82 into alignment with one another so that they can receive fasteners 40 (see FIG. 1) for attachment to a fitting as described above. In this example, the hinge is formed by a pin 83 that passes through projecting lugs 84 on each ring segment.

FIGS. 8 and 9 show another retaining ring 86 comprised of ring segments 88 and 90 that are pivotably connected to one another. In this embodiment, the pivoting connection is formed by a bushing 92 that is positioned in the apertures 94 at one end of each segment. The bushing 92 is sized to receive the fastener 40, as are the apertures 96 at the opposite ends of the segments. The ring 86 is openable and closable to be positioned around a pipe element, the center of rotation being one of the apertures 94, the other apertures 96 being brought into alignment as required to effect attachment to the fitting as described above.

For all of the retaining ring embodiments having multiple segments, the fasteners are instrumental in maintaining them in engagement with one another by passing through the aligned apertures in each segment, thereby ensuring that the retaining ring properly maintains engagement with shoulder 54.

FIG. 1 also illustrates a straight fitting 98 which operates differently from the aforementioned elbow fitting in effecting a joint between pipe elements 42 and 100 in the piping network 20. Straight fitting 98 has first and second openings 102 and 104 that are oppositely disposed. Each opening is surrounded by a respective inwardly facing conical surface 106 and 108. Grooves 110 and 112 are respectively positioned in each conical surface, the grooves holding seals 34 for ensuring a fluid tight joint. Inwardly facing conical surfaces 106 and 108 engage outwardly facing conical surfaces 114 and 116 on pipe elements 42 and 100. Again, the cone angles of the various conical surfaces may range between about 5 degrees and about 15 degrees, with about 10 degrees being advantageous for many situations. Preferably, the cone angles of interfacing conical surfaces are approximately equal.

For the straight fitting, two retaining rings 58 are used to form a joint between pipe elements 42 and 100. Each retaining ring engages a respective shoulder 124 and 126 of the pipe elements 42 and 100. The retaining rings are connected to one another by fasteners 40 which cooperate with nuts 62. When the fasteners are tightened, they draw the retaining rings 58 toward one another. The rings engage the shoulders 124 and 126 and thereby force the end portions 120 and 122 of each pipe element into respective openings 102 and 104 of the straight fitting. The outwardly facing conical surfaces 114 and 116 compress seals 34 into their respective grooves 110 and 112 and form metal to metal contact against the inwardly facing conical surfaces 106 and 108 of the fitting 98.

Figure 2C:
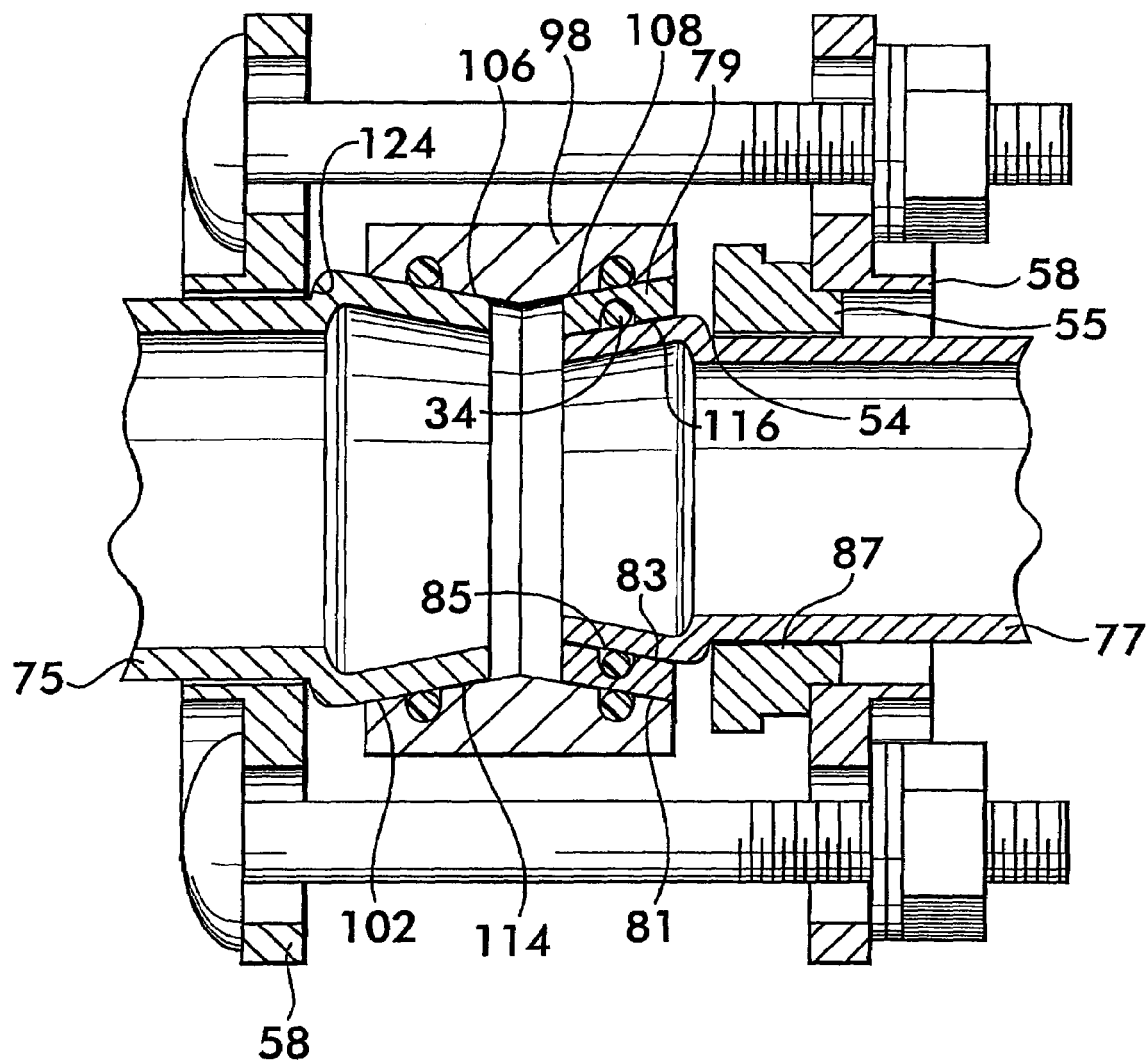
FIG. 2C is a longitudinal sectional view of a reducing coupling assembly according to the invention.
Figure 2D:
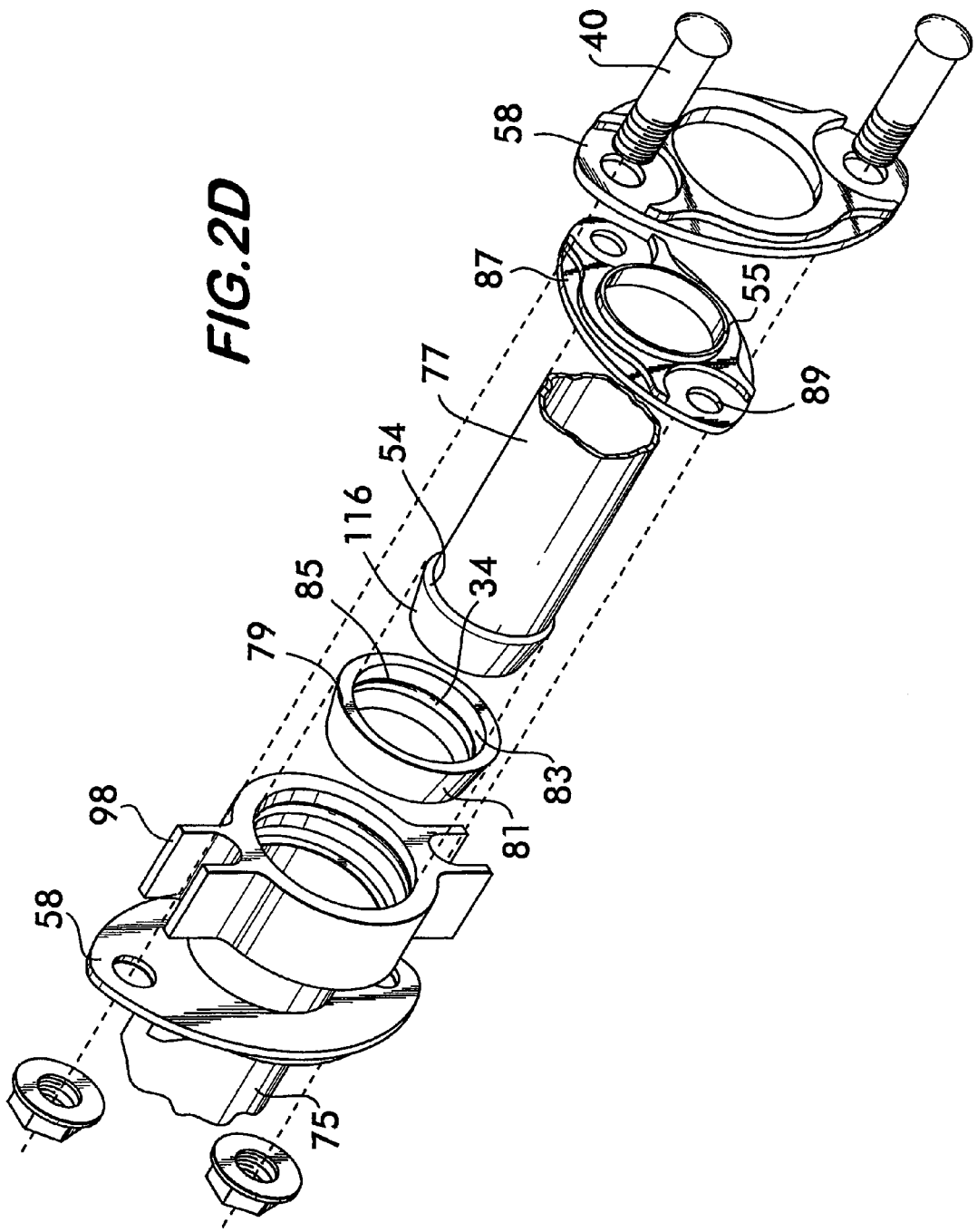
FIG. 2D is an exploded view of the coupling assembly shown in FIG. 2C.

The straight fitting may be readily adapted to serve as a reducing adapter. As shown in FIGS. 2C and 2D, a large diameter pipe element 75 is being joined to a small diameter pipe element 77. A straight fitting 98 that is compatible with the large diameter pipe element 75 is used to effect the joint. As best shown in FIG. 2C, the larger diameter pipe element 75 engages the opening 102 of the fitting as described above, with outwardly facing conical surface 114 of the pipe element engaging the inwardly facing conical surface 106 of the fitting and being forced into contact by a retaining ring 58 that engages the shoulder 124 on the pipe element. The small diameter pipe element 77 does not directly engage the fitting 98, but engages a conical adapter ring 79 (see also FIG. 2D) that has an outwardly facing conical surface 81 sized to engage the inwardly facing surface 108 of the fitting 98. Adapter ring 79 also has an inwardly facing conical surface 83 that is sized to receive the outwardly facing conical surface 116 of the small diameter pipe element 77. To ensure a fluid tight joint, the adapter ring 79 may have a groove 85 on its inwardly facing conical surface 83 that receives a seal 34 to engage the outwardly facing conical surface 116 of the small diameter pipe element 77. Alternately, the groove could be positioned in the pipe conical surface 116. To retain the small diameter pipe element 77 to the fitting 98 a second, smaller retaining ring 87 is interposed between the shoulder 54 and the larger retaining ring 58 that is sized to engage the shoulder of the large diameter pipe element 75. As shown in both FIGS. 2C and 2D, the small retaining ring 87 has a locating boss 55 that is received within the larger retaining ring 58 to maintain concentricity between the two rings. It is advantageous to use standard retaining ring designs so as to avoid proliferation of different parts. To that end, the second retaining ring 87 is the same as would be used to couple two small pipe element to one another, complete with apertures 89 that will not be used in the reducer adapter configuration. To avoid interference between the fasteners 40 attaching the retaining rings 58 to one another, the second retaining ring 87 is rotated so that the lugs defining the apertures are spaced angularly away from the fasteners joining the retaining rings 58 to each other. Alternately, a single retaining ring having the proper dimensions to both engage the pipe element shoulder and the fasteners could also be used.

Figure 10A:
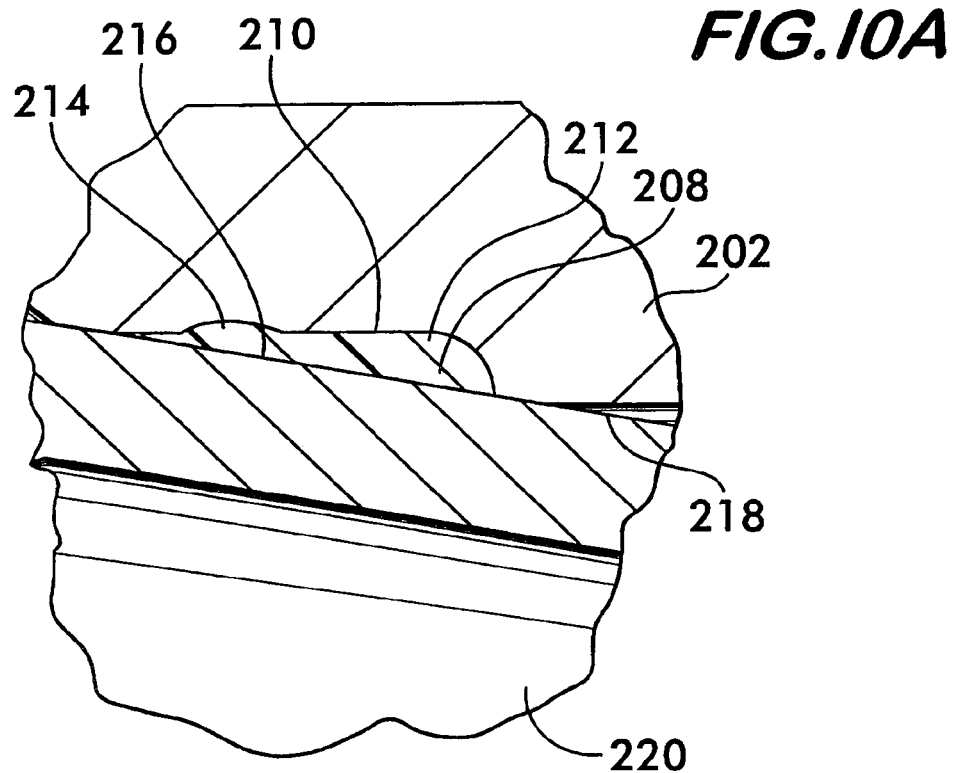
FIG. 10A is a detailed view of a portion of the coupling assembly shown in FIG. 10 on an enlarged scale.

FIG. 10 shows a coupling assembly embodiment 200 suitable for high temperature applications. Fitting 202 has a contoured interior surface 204 adjacent to the inwardly facing conical surface 206 which receives a high temperature ring seal 208. Seal 208 has an outer surface 210 with contours 212 matched to the contoured interior surface 204. The contours 212 preferably include a circumferential bulbous projection 214 which fits within a matching indentation 215 to help fix the seal 208 within the fitting during handling and assembly. Seal 208 also has an inwardly facing conical surface 216 which receives the outwardly facing surface 218 of the end portion 220 of pipe element 222 as best shown in FIG. 10A. Engagement between the inwardly facing surface 216 and the outwardly facing surface 218 promotes wedging action between the fitting and the pipe to provide a fluid tight fit. Preferably, for high temperature applications, the seal is formed of compressed exfoliated graphite which can withstand temperatures in the range between −400 degrees F. and 975 degrees F. Such material is available under the trade name GRAFOIL provided by Graftech, Inc. of Lakewood, Ohio. The seal is preferably compliant and deforms readily to adjust its shape to the surfaces between which it is compressed. Over-compression of the seal 208 is prevented by metal-to-metal contact between the outwardly facing surface 218 of the end portion 220 of the pipe element 222 and the inwardly facing conical surface 206 of the fitting 202, which limits compression of the seal. Metal-to-metal contact also increases the bending stiffness of the joint and prevents further distortion of the seal.

Figure 11:
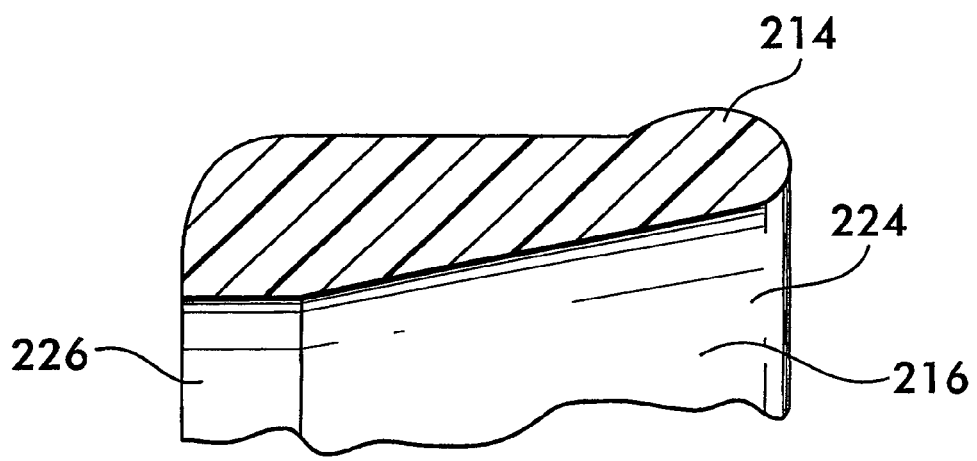
FIG. 11 is a partial sectional view of a component of the coupling assembly according to the invention.

FIG. 11 illustrates an alternate seal embodiment 224. In addition to an inwardly facing conical surface 216, the seal also has a flat region 226 positioned at an end of the seal opposite to the bulbous projection 214. The flat region helps prevent seal damage upon insertion of the pipe element 222 and also permits the seal to experience greater radial compression.

Due to the pliant nature of the graphite comprising the high temperature seals 208 and 224, it is advantageous to install the seals into the fitting using installation tools as illustrated in FIGS. 12-14. As shown in FIG. 12, seal 208 is positioned in the mouth 201 of the fitting 202. Then a seating tool 228 is pressed into the fitting. Seating tool 228 has a conical surface 230 which engages the seal at a portion of the inwardly facing conical surface 216 forward of the bulbous projection 214. The seating tool drags the seal 208 into the fitting, seating it in the contoured interior surface 204 as shown in FIG. 13. Next, as shown in FIG. 14, a deforming tool 232 is inserted behind the seating tool and between the seating tool and the seal. The deforming tool also has a conical surface 234 which engages a portion of the seal adjacent to the bulbous projection 214. The conical surface of the deforming tool is dimensioned so as to deform the seal radially outwardly and force the bulbous projection into the surface contour 204 of the fitting. The graphite forming the seal 208 readily takes a permanent set when deformed. Both tools are removed, leaving the seal seated within the fitting. Thus, the seal, when deformed to seat within the contour surface 204, will remain securely within the fitting when handled. Use of the seating and deforming tools ensures a more even pressure distribution applied to the seal, which mitigates damage to it upon installation and promotes complete and proper seating.

Although only an elbow and a straight fitting are illustrated, it is understood that the features of the invention are applicable to any type of fitting such as a tee, a reducer that adapts one pipe diameter to another, other elbows of greater or less than 90 degrees, as well as components such as valves, strainers, end caps and the like. The fittings may be made of various materials, such as ductile iron for use with steel pipe, stainless steel for use with stainless steel pipe, brass or bronze for use with copper tubing, as well as plastics such as PVC and CPVC.

Coupling assemblies according to the invention provide numerous advantages. Smaller seals may be used, thereby allowing seals made from expensive materials to be employed without economic penalty. Such seals include fluoroelastomers sold under the trademark Viton and perfluoroelastomers sold under the trademarks Chemraz and Kalraz. Other materials may be used to advantage as well, including non-elastomers such as graphite, Teflon®, various metal alloy seals and packing materials. Fittings using the more expensive fluoro and perfluoro elastomers are well suited for chemical applications due to the chemical inertness of such materials. Couplings according to the invention that use graphite seals are also well suited for handling high pressure hot water applications (250 degrees F. or greater) and low pressure steam as used in process heating applications. The use of interfacing conical surfaces providing wedging action combined with bolted retaining rings all but eliminates the potential for blowout or seal extrusion under working and field test pressures. This arrangement also provides excellent joint stiffness about all axes. Furthermore, each assembly forms a union that may itself be disassembled without disassembly of other joints. The absence of multiple couplings on fittings such as elbows allows the coupling assembly disclosed herein to compete with threaded coupling systems on the basis of center to end dimensions while providing superior fluid tightness, especially upon initial assembly, where up to 8% of threaded joints are expected to leak and require attention. The assembly according to the invention also allows thin walled tube to be used and eliminates the stress concentration and weakness of exposed threads for bending and corrosion considerations.

What is claimed is:

1. A pipe coupling assembly, comprising:
   a fitting having an opening surrounded by an inwardly facing conical surface;
   a first lug positioned on said fitting and projecting outwardly therefrom, said first lug having an aperture therein;

a pipe element having an end portion with an outwardly facing conical surface sized to interfit within said opening and engage said inwardly facing conical surface;

a shoulder positioned on said pipe element adjacent to said end portion and projecting radially outwardly therefrom;

a retaining ring surrounding said pipe element and engaging said shoulder;

a second lug positioned on said retaining ring and projecting outwardly therefrom, said second lug having aperture therein; and a fastener extending between said apertures of said first and second lugs for connecting said retaining ring to said fitting, said fastener being adjustably tightenable for drawing said retaining ring toward said fitting and thereby forcing said end portion into engagement with said fitting.

2. A pipe coupling assembly according to claim 1, further comprising:

a third lug positioned on said fitting and projecting outwardly therefrom, said third lug having an aperture therein;

a fourth lug positioned on said retaining ring and projecting outwardly therefrom, said fourth lug having an aperture therein; and a second fastener extending between said apertures of said third and fourth lugs, said second fastener being adjustably tightenable for drawing said retaining ring toward said fitting and thereby forcing said end portion into engagement with said fitting.

3. A pipe coupling assembly according to claim 2, wherein said retaining ring is a unitary ring.

4. A pipe coupling assembly according to claim 2, wherein said retaining ring is formed from at least two pieces joined end-to-end.

5. A pipe coupling assembly according to claim 4, wherein said two pieces are hingedly attached to one another at one end.

6. A pipe coupling assembly according to claim 1, further comprising a seal positioned between said inwardly and outwardly facing conical surfaces.

7. A pipe coupling assembly according to claim 6, wherein said seal is formed of graphite.

8. A pipe coupling assembly according to claim 6, further comprising a circumferential groove positioned in said inwardly facing conical surface, said seal being received within said groove.

9. A pipe coupling assembly according to claim 8, further comprising a second seal positioned within said groove.

10. A pipe coupling assembly according to claim 1, wherein said outwardly facing conical surface has a cone angle between about 5 degrees and about 15 degrees relative to a longitudinal axis of said pipe element.

11. A pipe coupling assembly according to claim 1, wherein said outwardly facing conical surface has a cone angle of about 10 degrees relative to a longitudinal axis of said pipe element.

12. A pipe coupling assembly according to claim 1, wherein said inwardly facing conical surface has a cone angle between about 5 degrees and about 15 degrees relative to a longitudinal axis of said fitting.

13. A pipe coupling assembly according to claim 1, wherein said inwardly facing conical surface has a cone angle of about 10 degrees relative to a longitudinal axis of said fitting.

14. A pipe coupling assembly according to claim 1, wherein said end portion comprises a sidewall that is deformed outwardly from an initial diameter thereby forming said outwardly facing conical surface and said shoulder.

15. A pipe coupling assembly according to claim 14, wherein said end portion has an opening that is approximately equal in diameter to an undeformed portion of said pipe element.

* * * * *